United States Patent
McGraw (10) Patent No.: US 7,570,204 B1
(45) Date of Patent: Aug. 4, 2009

(54) GENERALIZED DIVERGENCE-FREE CARRIER SMOOTHING AND DUAL FREQUENCY DIFFERENTIAL GPS ARCHITECTURE IMPLEMENTING THE SAME

(75) Inventor: Gary A. McGraw, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/513,454

(22) Filed: Aug. 31, 2006

(51) Int. Cl.
  *G01S 5/14* (2006.01)
(52) U.S. Cl. .............................. 342/357.03
(58) Field of Classification Search ............ 342/357.03
  See application file for complete search history.

(56) References Cited

U.S. PATENT DOCUMENTS

| | | | |
|---|---|---|---|
| 3,521,278 A * | 7/1970 | Lewis et al. .................. 342/31 |
| 4,866,450 A * | 9/1989 | Chisholm ................... 342/410 |
| 4,894,655 A * | 1/1990 | Joguet et al. ................ 340/988 |
| 5,323,322 A * | 6/1994 | Mueller et al. .............. 701/215 |
| 5,361,212 A * | 11/1994 | Class et al. .................. 701/16 |
| 5,471,217 A * | 11/1995 | Hatch et al. ............. 342/357.02 |
| 5,955,971 A * | 9/1999 | Uemura ...................... 340/947 |
| 6,002,362 A * | 12/1999 | Gudat .................... 342/357.03 |
| 6,188,958 B1 * | 2/2001 | Gu et al. ..................... 701/215 |
| 6,198,430 B1 * | 3/2001 | Hwang et al. .......... 342/357.03 |
| 6,266,009 B1 * | 7/2001 | Hwang ................... 342/357.12 |
| 6,751,467 B1 * | 6/2004 | Cameron et al. ............. 455/516 |
| 6,903,682 B1 * | 6/2005 | Maddox ................. 342/357.06 |
| 6,961,018 B2 * | 11/2005 | Heppe et al. ............ 342/357.08 |
| 7,102,563 B2 * | 9/2006 | Rapoport et al. ......... 342/357.04 |
| 7,117,417 B2 * | 10/2006 | Sharpe et al. ................ 714/746 |
| 7,227,496 B2 * | 6/2007 | Bird ....................... 342/357.06 |
| 2005/0110676 A1 * | 5/2005 | Heppe et al. ............ 342/357.08 |
| 2005/0203702 A1 * | 9/2005 | Sharpe et al. ................ 701/213 |
| 2005/0212696 A1 * | 9/2005 | Bartone et al. .......... 342/357.02 |
| 2006/0047413 A1 * | 3/2006 | Lopez et al. ................. 701/200 |
| 2006/0064244 A1 * | 3/2006 | Robbins ...................... 701/214 |
| 2006/0164297 A1 * | 7/2006 | Hernandez-Pajares et al. ...................... 342/357.03 |
| 2007/0046535 A1 * | 3/2007 | May et al. ............... 342/357.12 |
| 2007/0216575 A1 * | 9/2007 | DiEsposti .............. 342/357.15 |

OTHER PUBLICATIONS

Hwang et al., P. Y., "Enhanced Differential GPS Carrier-Smoothed Code Processing Using Dual-Frequency Measurements", Journal of the Institute of Navigation, vol. 46, No. 2, pp. 127-137, May 1999.

(Continued)

*Primary Examiner*—Thomas H Tarcza
*Assistant Examiner*—Harry Liu
(74) *Attorney, Agent, or Firm*—Daniel M. Barbieri (57) ABSTRACT

A method of generating differentially-corrected smoothed pseudorange data in a differential global positioning system (DGPS) includes generating, at a base station, non-mode specific pseudorange and carrier phase correction data. The non-mode specific pseudorange and carrier phase correction data is then provided to a remote receiver. At the remote receiver, one of a plurality of specific smoothing modes of operation is selected for use in generating differentially-corrected smoothed pseudorange and carrier phase data. The differentially-corrected smoothed pseudorange and carrier phase data is then generated by the remote receiver using the selected one of the plurality of specific smoothing modes of operation, and as a function of the non-mode specific pseudorange and carrier phase correction data received from the base station.

17 Claims, 8 Drawing Sheets

OTHER PUBLICATIONS

McGraw et al., G. A., "Dual Frequency Smoothing DGPS Performance Evaluation Studies", Proceedings of Institute of Navigation National Technical Meeting, San Diego, California, pp. 1-12, Jan. 2005.

Hatch et al., R., "A Computationally Efficient Ambiguity Resolution Technique", Proceedings of the 14$^{th}$ Institute Technical Meeting of the Institute of Navigation, ION GPS 2001, Salt Lake City, Utah, pp. 1-7, Sep. 2001.

Bosely et al., K., "Demonstration System for Using Shipboard-Relative GPS", GPS World, pp. 1-9, Apr. 2005.

Collins, J. P.,. "An Overview of GPS Inter-Frequency Carrier Phase Combinations", Geodesy and Geomatics Engineering Report, University of New Brunswick, pp. 1-15, Oct. 1999.

ARINC Engineering Services, LLC, "Common Architecturtre Evaluation (CAE) Report for Joint Precision Approach and Landing System (JPALS)", prepared for Electronic Systems Center, Hanscorn AFB, MA, pp. 1-106, Apr. 2005.

* cited by examiner

GENERALIZED DIVERGENCE-FREE CARRIER SMOOTHING AND DUAL FREQUENCY DIFFERENTIAL GPS ARCHITECTURE IMPLEMENTING THE SAME

BACKGROUND

The present invention relates to spread spectrum global navigation system receivers such as global positioning system (GPS) receivers. More particularly, the present invention relates to differential GPS (DGPS) base stations and receivers which implement methods of carrier smoothing code pseudorange measurements.

Global navigational satellite systems (GNSS) are known and include the global positioning system (GPS) and the Russian global orbiting navigational satellite system (GLONASS). GNSS-based navigational systems are used for navigation and positioning applications. In the GPS navigational system, GPS receivers receive satellite positioning signals from a set of up to 32 satellites deployed in 12-hour orbits about earth and dispersed in six orbital planes at an altitude of 10,900 nautical miles. Each GPS satellite continuously transmits two spread spectrum, L-band signals: an L1 signal having a frequency $f_{L1}$ of 1575.42 MHz, and an L2 signal having a frequency $f_{L2}$ of 1227.6 MHz. The L1 signal from each satellite is modulated by two pseudo-random codes, the coarse acquisition (C/A) code and the P-code. The P-code is normally encrypted, with the encrypted version of the P-code referred to as the Y-code. The L2 signal from each satellite is modulated by the Y-code. The C/A code is available for non-military uses, while the P-code (Y-code) is reserved for military uses.

GPS navigational systems determine positions by timing how long it takes the coded radio GPS signal to reach the receiver from a particular satellite (e.g., the travel time). The receiver generates a set of codes identical to those codes (e.g., the Y-code or the C/A-code) transmitted by the satellites. To calculate the travel time, the receiver determines how far it has to shift its own codes to match the codes transmitted by the satellites. The determined travel times for each satellite are multiplied by the speed of light to determine the distances from the satellites to the receiver. By receiving GPS signals from four or more satellites, a receiver unit can accurately determine its position in three dimensions (e.g., longitude, latitude, and altitude). A conventional GPS receiver typically utilizes the fourth satellite to accommodate a timing offset between the clocks in the receiver and the clocks in the satellites. Additional satellite measurements can be used to improve the position solution.

Differential GPS (DGPS) utilizes a base station located at a known position and one or more remote GPS receivers. The base station receives GPS positioning signals from the satellites and calculates predicted measurements based upon the known base station location. Based upon differences between the predicted base station measurements and the actual measurements, the base station transmits corrections to the remote GPS receiver. The remote GPS receiver uses the corrections and received GPS satellite signals to calculate its position more accurately.

The smoothing of GPS code pseudorange measurements with carrier phase measurements is a well-established GPS signal processing technique. See for example U.S. Pat. No. 6,198,430 B1 issued on Mar. 6, 2001 to Hwang et al. and entitled ENHANCED DIFFERENTIAL GNSS CARRIER-SMOOTHED CODE PROCESSING USING DUAL FREQUENCY MEASUREMENTS, which is incorporated by reference in its entirety. Dual Frequency Smoothing and associated DGPS architecture are also known. One advantage of Dual Frequency Smoothing compared to conventional single frequency carrier smoothing of code pseudorange measurements is the elimination of the effects of ionospheric divergence in the processing. In the DGPS context, Dual Frequency Smoothing permits the measurement smoothing operations at the reference station and the airborne unit to be completely decoupled which enables longer smoothing on the ground to mitigate multipath and shorter smoothing in the airborne unit for fast convergence. This flexibility in designing the carrier smoothing in differential processing is one of the advantages of Dual Frequency Smoothed DGPS over single frequency code DGPS.

Generally, two types of Dual Frequency Smoothing have been considered: "Divergence-Free" (DF) smoothing and "Ionosphere-Free" (IF) smoothing. In IF smoothing, the ionospheric delay is removed from the smoothed pseudorange, whereas in DF smoothing the effects of the ionospheric divergence are removed from the smoothing, but the instantaneous ionospheric delay remains in the smoothed pseudorange. Two specific forms of DF smoothing involve the L1 and L2 pseudoranges. The DF pseudoranges have substantially smaller noise and multipath errors than the IF pseudoranges, and with differential processing the residual ionospheric delay in the DF pseudoranges largely cancels. Additionally, other combinations of dual frequency pseudorange and carrier phase measurements can be processed in a DF form, with some operational advantages for geometry-free carrier phase integer ambiguity resolution.

Conventionally, to implement various specific DGPS smoothing modes of operation (e.g., wide-lane processing, iono-free processing, etc.), mode specific processing at the base or reference station must be implemented to generate mode specific correction data for transmission to the remote GPS receiver. The GPS receiver then implements further mode specific processing using the mode specific correction data from the base station. This adds complexity to the base station processing, particularly if it is desired to be able to switch from one specific mode to another (e.g., from Wide-Lane processing to Iono-Free processing, etc.).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method of generating differentially-corrected smoothed pseudorange data in a differential global positioning system (DGPS) includes generating, at a base station, non-mode specific pseudorange and carrier phase correction data. The non-mode specific pseudorange and carrier phase correction data is then provided to a remote receiver. At the remote receiver, one of a plurality of specific smoothing modes of operation is selected for use in generating smoothed pseudorange data. The smoothed pseudorange data is then generated by the remote receiver using the selected one of the plurality of specific smoothing modes of operation, and as a function of the non-mode specific pseudorange and carrier phase correction data received from the base station.

BRIEF DESCRIPTION OF THE DRAWINGS

FIG. 2-1 is a block diagram illustrating a prior art DGPS system.

FIG. 2-2 is a block diagram illustrating a prior art DGPS base station configured to implement one type of mode specific smoothing processing.

DETAILED DESCRIPTION

This present disclosure introduces a Generalized Divergence Free Smoothing (GDFS) method and describes a dual frequency DGPS architecture that provides maximal commonality between code DGPS and carrier phase Real Time Kinematic (RTK) processing. An analysis approach is developed which assesses the GDFS code, carrier, and ionospheric errors. It is demonstrated that the wide-lane carrier phase/narrow-lane code combination commonly-used for geometry-free carrier phase integer ambiguity resolution, has nearly optimal pseudorange error characteristics. This improved pseudorange accuracy can be very useful in achieving stringent performance requirements for a number of different applications.

General DGPS System

Figure 1:
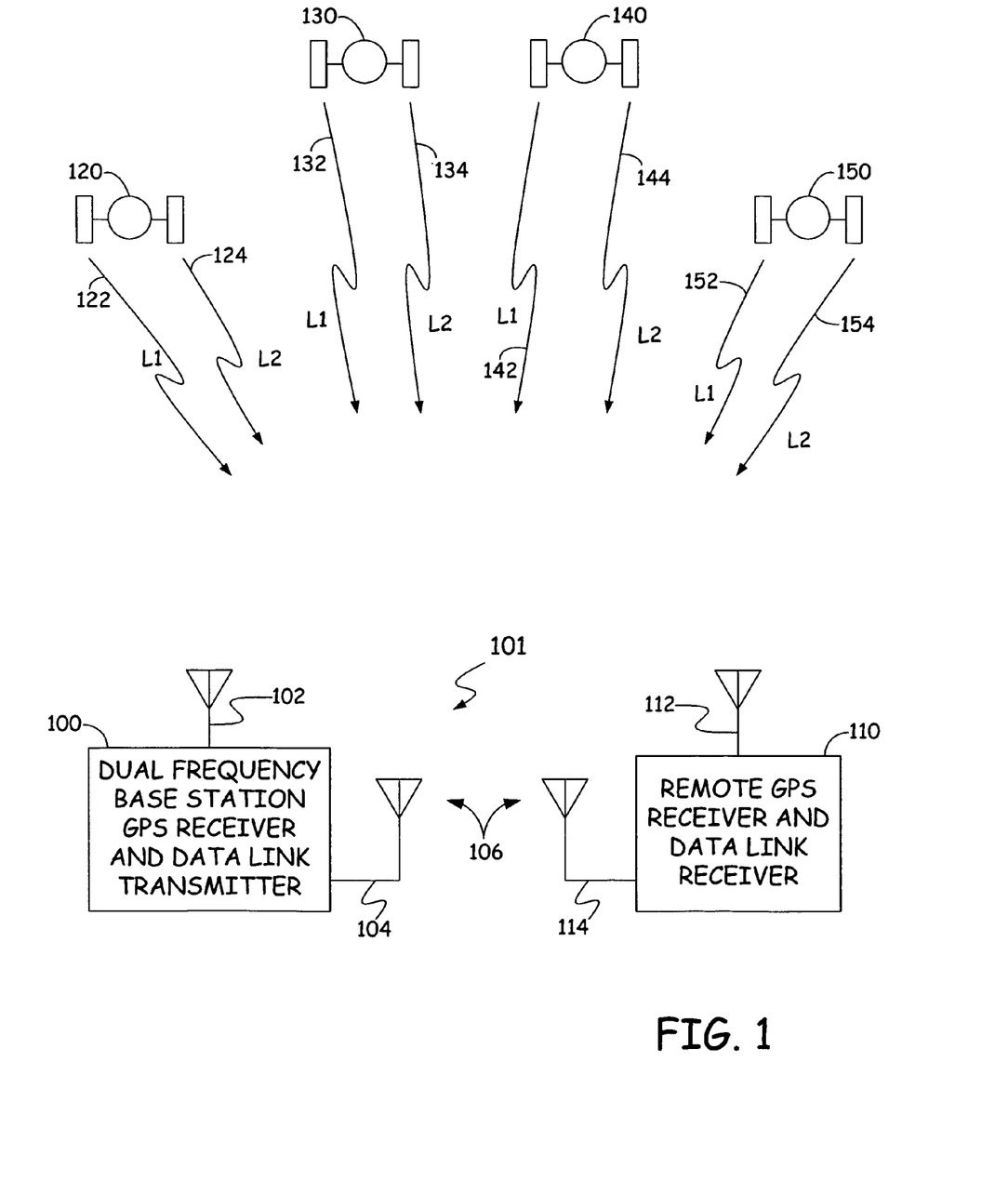
FIG. 1 is a block diagram of a differential global positioning system (DGPS) base station and a remote DGPS receiver.

FIG. 1 is a block diagram of dual frequency DGPS base station 100 and a remote DGPS receiver 110 (for example an airborne receiver) operating in an environment in which they receive at antennas 102 and 112 both L1 and L2 global positioning signals from multiple satellites. DGPS base station 100 and remote receiver 110 form a DGPS system 101 coupled using uplink 106. As illustrated, satellite 120 transmits L1 positioning signal 122 and L2 positioning signal 124. Satellite 130 transmits L1 positioning signal 132 and L2 positioning signal 134. Satellite 140 transmits L1 positioning signal 142 and L2 positioning signal 144. Satellite 150 transmits L1 positioning signal 152 and L2 positioning signal 154. Typically, positioning signals from other "visible" GPS satellites will also be received by antennas 102 and 112 of base station 100 and remote receiver 110. Dual frequency GPS base station 100 implements dual frequency carrier smoothing methods to improve the accuracy of the smoothed pseudorange measurements. The dual frequency carrier smoothed pseudorange correction information is transmitted from base station 100 to remote receiver 110 via uplink 106. As illustrated, uplink 106 is a radio communications link between the base station and remote receiver established using antennas 104 and 114. However, other types of uplinks which are known in the art can be used.

Conventional DGPS Signal Processing

Figure 21:
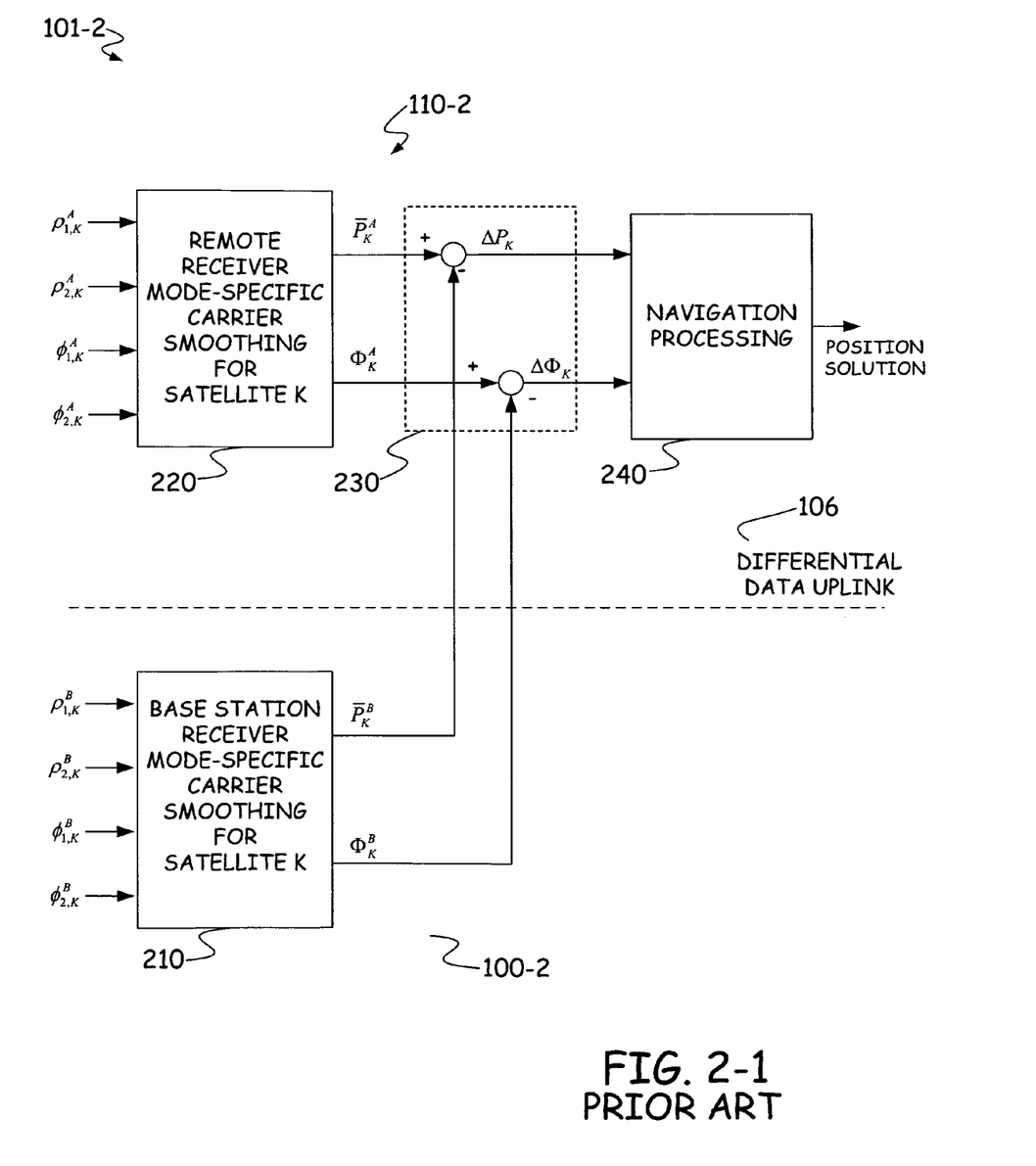
Figure 22:
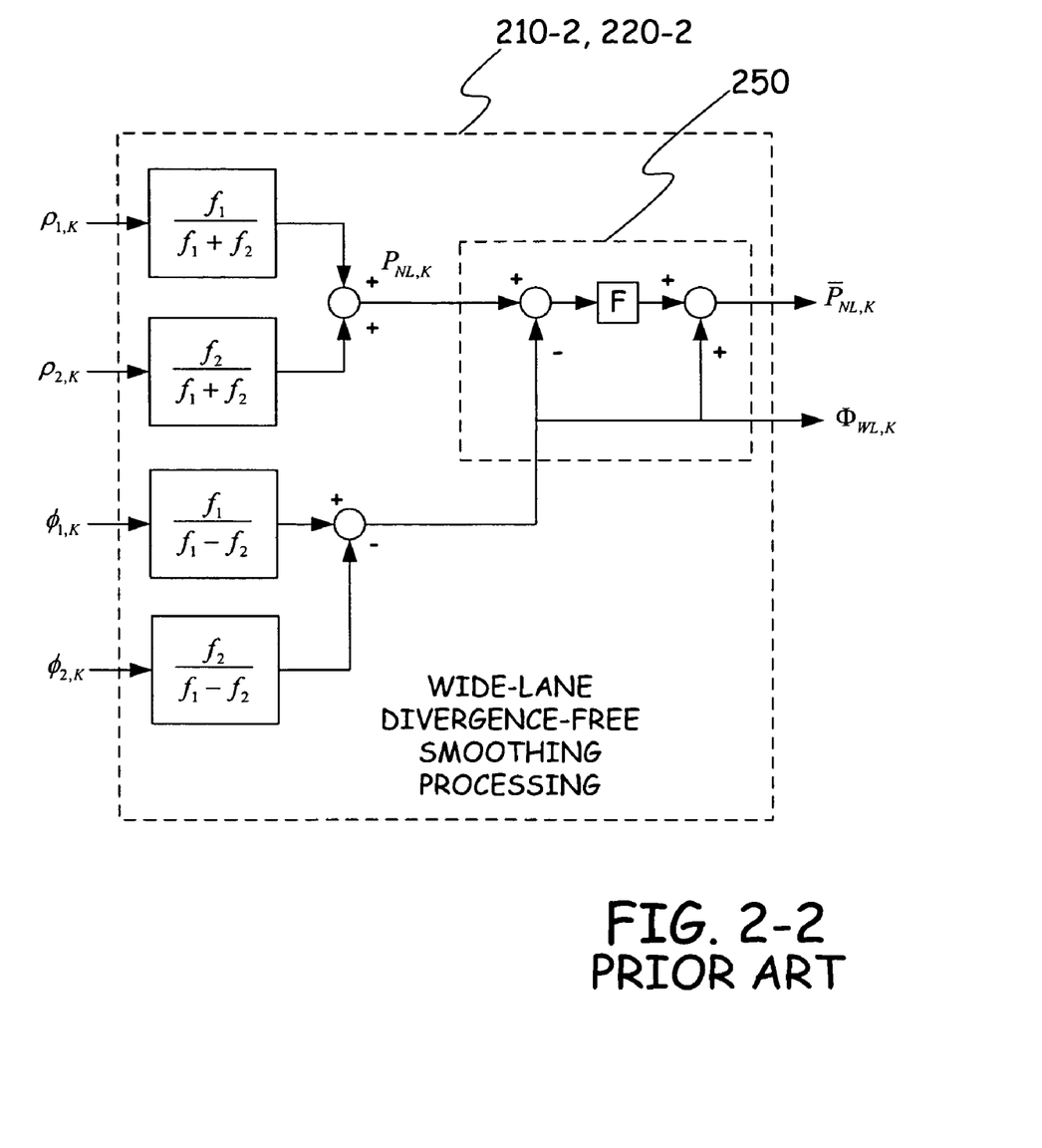

As described above, when a conventional DGPS system is configured to operate in a specific smoothing mode of operation (e.g. wide-lane processing, iono-free processing, L1 DFS processing, etc., all of which are described in greater detail below), the base or reference station 100 has conventionally implemented the specific processing functions to generate mode specific correction data for transmission to the remote receiver. An example of this for the "Kth" satellite is illustrated in the DGPS system embodiment 101-2 shown in FIG. 2-1 in which base station processing 210 in a base station 100-2 receives as inputs the L1 and L2 pseudorange measurements $\rho_{1,K}{}^B$ and $\rho_{2,K}{}^B$ and carrier phase measurements $\phi_{1,K}{}^B$ and $\phi_{2,K}{}^B$. The base station 100-2 is configured to implement mode-specific carrier smoothing and generate differential measurement data, $\overline{P}_K{}^B$ and $\overline{\Phi}_K{}^B$, that are uplinked to the remote receiver 110-2. The remote receiver 110-2 implements identical mode-specific smoothing processing 220 using measurements $\rho_{1,K}{}^A$, $\rho_{2,K}{}^A$, $\phi_{1,K}{}^A$, and $\phi_{2,K}{}^A$ to form measurements $\overline{P}_K{}^A$ and $\overline{\Phi}_K{}^A$. The remote receiver combines the base station differential data with its own measurements, e.g., at combining component or step 230, to compute differentially corrected measurement residuals $\Delta P_K$ and $\Delta \Phi_K$, that are provided with other satellite measurements to the navigation processing, 240, to produce a position solution. A specific example of mode-specific carrier smoothing using the wide-lane carrier phase and narrow-lane pseudorange is illustrated in FIG. 2-2. The reference numbers 210-2 and 220-2 represent that this smoothing can be implemented in the base station receiver and the remote receiver. The wide-lane carrier phase $\Phi_{WL,K}$ is formed by differencing scaled L1 and L2 carrier phase measurements (in units of length, e.g., meters) as $$\Phi_{WL,K} = \frac{f_{L1}}{f_{L1} - f_{L2}} \phi_{1,K} - \frac{f_{L2}}{f_{L1} - f_{L2}} \phi_{2,K}$$

where $f_{L1}$ and $f_{L2}$ are the L1 and L2 frequencies. Similarly the narrow-lane code measurement $P_{NL,K}$ is formed as $$P_{NL,K} = \frac{f_{L1}}{f_{L1} + f_{L2}} \rho_{1,K} + \frac{f_{L2}}{f_{L1} + f_{L2}} \rho_{2,K}$$

The wide-lane carrier phase and narrow-lane pseudorange measurements are combined in a complementary filter 250 which attenuates the pseudorange noise and multipath without affecting the satellite line-of-sight dynamical information. Further description of the operation of the complementary filter is provided later.

The base station and remote receivers, must be configured to implement compatible smoothing processing for differential processing to be effective. Therefore in order to switch to another smoothing mode of operation, using conventional techniques, it would typically be necessary for the base station to also be configured to generate the corresponding specific correction data for that specific mode of operation. This can lead to increased complexity in the base station, for example. Alternatively, unsmoothed L1 and L2 pseudorange data has been uplinked from the base station which can lead to degraded accuracy.

Generalized Dual Frequency Smoothed DGPS Signal Processing

Figure 3:
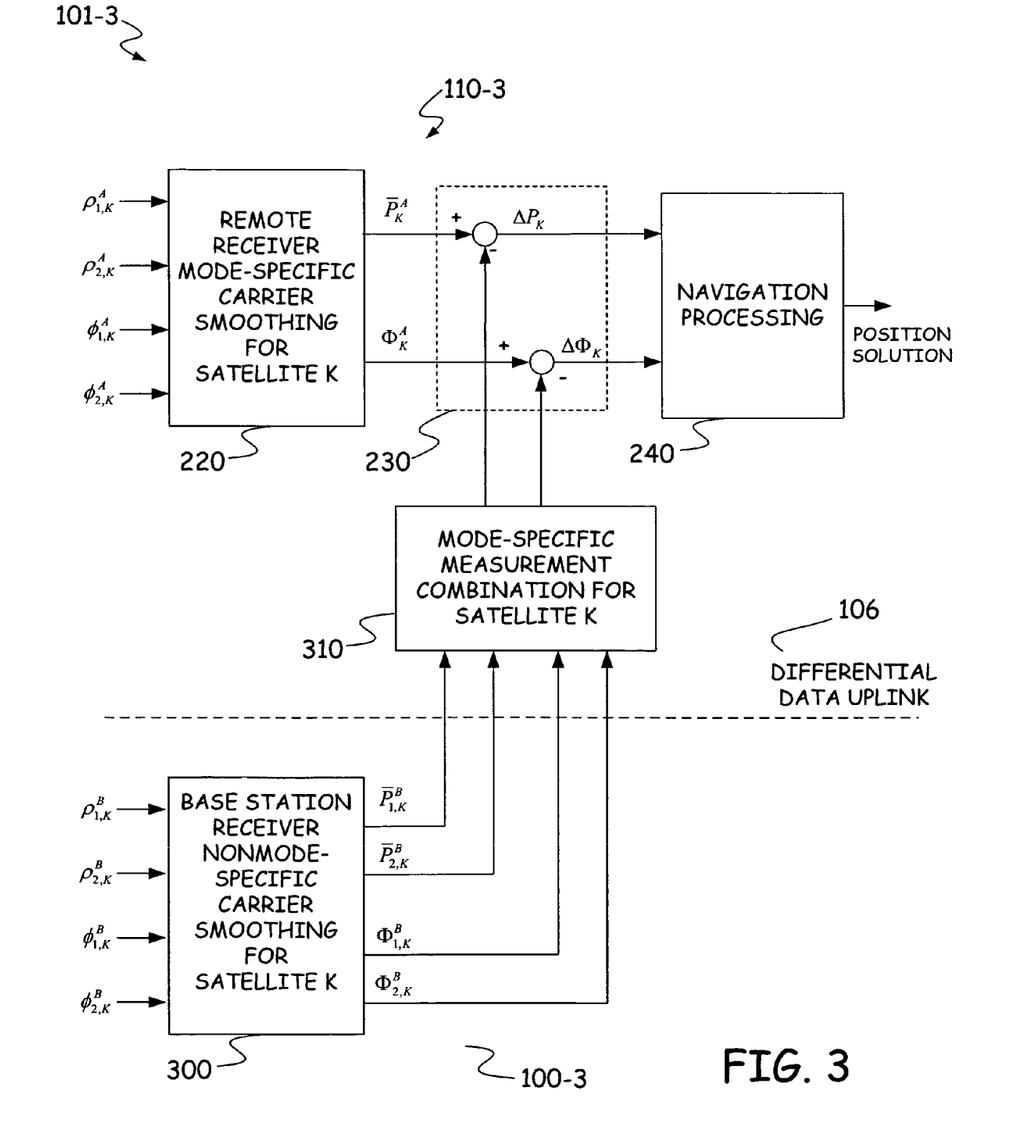
FIG. 3 is a block diagram illustrating a DGPS system embodiment including a base station configured to implement non-mode specific smoothing processing and a remote receiver configured to implement mode specific smoothing processing.

FIG. 3 illustrates some embodiments of the present invention, wherein a DGPS system 101-3 is configured to operate in a specific smoothing mode of operation using a more flexible carrier smoothing technique. As with other disclosed embodiments, reference numbers are intended to represent both components and, where appropriate, the processing functions or steps which the components are configured to implement. In these embodiments, the base or reference station 100-3 is configured to implement processing steps 300 (representing both the processing steps and corresponding configured components) to generate complementary sets of non-mode specific smoothed pseudorange and carrier phase correction data. This non-mode specific smoothed pseudorange and carrier phase correction data is then transmitted to the remote receiver 110-3, where processing steps for specific smoothing modes of operation 310 are carried out using the data. Using this technique, the specific smoothing mode of operation can be changed without changing the processing steps implemented in the base station as would conventionally have been required. In other words, each of multiple specific smoothing modes of operation can be implemented using the same non-mode specific pseudorange and carrier phase correction data, allowing the base station processing to be simplified while maintaining flexibility in the remote receiver to switch between modes or support multiple remote receivers operating in different modes. More detailed description of the generalized divergence free smoothing processing and the various embodiments of the present invention are provided below.

Generalized Divergence Free Processing

Measurement Models

For the purposes of the generalized divergence free smoothing (GDFS) derivation, the following simplified models are used for the GPS code and carrier phase measurements (where x=1 or 2, for the signal at frequency $f_x$):

$$\rho_x = r + I_x + w_x$$
$$\phi_x = r - I_x + v_x + N_x \tag{1}$$

where
$\rho_x$=Lx code pseudorange measurement
$r$=Geometric Line of Sight (LOS) range plus range errors common to pseudorange and carrier phase, including SV clock and ephemeris errors, receiver clock, and tropospheric errors
$I_x$=Lx ionospheric refraction
$w_x$=Lx code-tracking noise and multipath
$\phi_x$=Lx carrier phase measurement
$N_x$=Range ambiguity for the Lx carrier, $N_x = \lambda_x n_x$, where $n_x$ is an integer.
$v_x$=Lx carrier-tracking noise and multipath The L1 and L2 frequencies are used as specific examples in the derivation, but any two GNSS frequency combinations, such as GPS L1 and L5 or Galileo E1 and E2 could be used. The ionospheric delay for frequency $f_x$ can be modeled as shown in Equation 2:

$$I_x = K_I / f_x^2 \tag{2}$$

When the need arises to distinguish between measurements from specific satellites and receivers, the notation is used where the superscript "A" or "B" refers to the receiver (denoting airborne and base station) and the subscript lower case letter refers to the satellite. For example, $\rho_{1,k}^A$ is the L1 pseudorange measurement for the $k^{th}$ satellite at receiver "A".

GDFS Derivation

Figure 4:
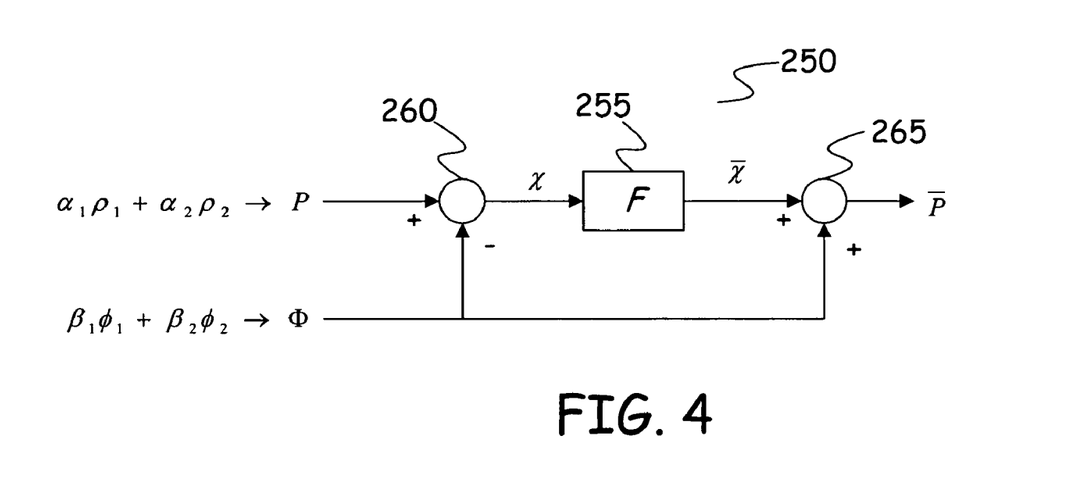
FIG. 4 is a block diagram illustrating an embodiment of a complementary filter which implements smoothing.

In an example embodiment of generalized divergence-free smoothing processing, the GDFS processing is illustrated in the block diagram of FIG. 4 in the form of a complementary filter 250. Filter 250 can be implemented by DGPS base station embodiments (e.g., base station 100, 100-3, etc.) and DGPS remote receiver embodiments (e.g., receivers 110, 110-3, etc.) in hardware, firmware or software. Filter 250 includes low-pass filter 255, subtraction node 260 and summation node 265. As inputs to filter 250, generalized code and carrier phase measurements are formed by combining the L1 and L2 code and carrier measurements, for example as represented in Equation 3:

$$P = \alpha_1 \rho_1 + \alpha_2 \rho_2$$
$$\Phi = \beta_1 \phi_1 + \beta_2 \phi_2 \tag{3}$$

where $\alpha_1$, $\alpha_2$, $\beta_1$, and $\beta_2$ are coefficients to be determined. To preserve the LOS range information in the generalized measurements, the relationships shown in Equations 4 and 5 are used.

$$\alpha_1 + \alpha_2 = 1 \tag{4}$$
$$\beta_1 + \beta_2 = 1 \tag{5}$$

The function of the low-pass filter 255, F, in FIG. 4 is to attenuate the code noise and multipath. To accomplish this without distorting the LOS range information, the filter operates on the code-minus-carrier (CMC) signal, $\chi$ provided at the output of subtraction node 260. Combining Equations 1 and 3, and applying Equations 4 and 5, the CMC can be written as:

$$\chi = P - \Phi$$
$$= (\alpha_1 \rho_1 + \alpha_2 \rho_2) - (\beta_1 \phi_1 + \beta_2 \phi_2)$$
$$= (\alpha_1 + \alpha_2) r - (\beta_1 + \beta_2) r + (\alpha_1 w_1 + \alpha_2 w_2)$$
$$- (\beta_1 v_1 + \beta_2 v_2) - (\beta_1 N_1 + \beta_2 N_2)$$
$$+ (\alpha_1 + \beta_1) I_1 + (\alpha_2 + \beta_2) I_2$$
$$= (\alpha_1 w_1 + \alpha_2 w_2) - (\beta_1 v_1 + \beta_2 v_2)$$
$$- (\beta_1 \lambda_1 n_1 + \beta_2 \lambda_2 n_2)$$
$$+ [(\alpha_1 + \beta_1) I_1 + (\alpha_2 + \beta_2) I_2] \tag{6}$$

To eliminate the effect of ionospheric divergence on the smoothing processing, it is useful for the last term in Equation 6 to be zero. Using Equation 2, the condition shown in Equation 7 is obtained:

$$(\alpha_1 + \beta_1) f_2^2 + (\alpha_2 + \beta_2) f_1^2 = 0 \tag{7}$$

This provides Equations, 4, 5 and 7, for the four unknowns, $\alpha_1$, $\alpha_2$, $\beta_1$, and $\beta_2$. Therefore one of the parameters can be arbitrarily chosen. Using $\alpha_1$ as this independent variable, the following expressions result:

$$\alpha_2 = 1 - \alpha_1 \tag{8}$$
$$\beta_1 = \frac{2 f_1^2}{f_1^2 - f_2^2} - \alpha_1$$
$$\beta_2 = \alpha_1 - \frac{f_1^2 + f_2^2}{f_1^2 - f_2^2}$$

Divergence-Free Measurement Combinations

An examination of some specific special cases of GDFS based on particular choices for $\alpha_1$ in Equation 8 is now made.

L1 and L2 DFS

Choosing, $\alpha_1 = 1$, so that $P = \rho_1$, yields a known L1 divergence-free smoothed pseudorange. Similarly, choosing $\alpha_1 = 0$, so that $P = \rho_2$, yields the L2 divergence-free smoothed pseudorange. The GDFS filter inputs in these cases are:

$$P_1 = \rho_1, \Phi_1 = \frac{f_1^2 + f_2^2}{f_1^2 - f_2^2}\phi_1 - \frac{2f_2^2}{f_1^2 - f_2^2}\phi_2$$

$$P_2 = \rho_2, \Phi_2 = \frac{2f_1^2}{f_1^2 - f_2^2}\phi_1 - \frac{f_1^2 + f_2^2}{f_1^2 - f_2^2}\phi_2$$

Ionosphere-Free Smoothing

A special case of GDFS is obtained by eliminating the ionosphere in both P and $\Phi$ individually, rather than just in the CMC as accomplished in Equation 7. From Equations 2 and 3, this is achieved in the generalized code measurement, P, by having $$\frac{\alpha_1}{f_1^2} + \frac{\alpha_2}{f_2^2} = 0$$

With Equations 4 and 8, one gets the relationships defined in Equation 9.

$$\alpha_1 = \beta_1 = \frac{f_1^2}{f_1^2 - f_2^2} \triangleq \alpha_{IF} \tag{9}$$

This case is the "Ionosphere-Free" smoothing.

Integer Ambiguity Combinations

So far in the GDFS development there is nothing to prevent the resulting carrier phase ambiguity from losing its integer cycle nature and this is true unless additional constraints are imposed. To get an integer cycle, the coefficients on $n_1$ and $n_2$ in Equation 6 must be equal or opposite so that a common factor can be pulled out in front of a combination of integers. Referring to Equation 6, this can be accomplished when the carrier phase ambiguity term can be written as $$\beta_1 \lambda_1 n_1 + \beta_2 \lambda_2 n_2 = \left(\frac{\beta_1 \lambda_1}{m_1}\right) m_1 n_1 + \left(\frac{\beta_2 \lambda_2}{m_2}\right) m_2 n_2$$

where $m_1$ and $m_2$ are arbitrary integers. Equating the coefficients of the integer terms and using Equation 5 yields the relationship represented in Equation 10:

$$\beta_1 = \frac{m_1 \lambda_2}{m_2 \lambda_1 + m_1 \lambda_2} = \frac{m_1 f_1}{m_1 f_1 + m_2 f_2} \tag{10}$$

The resulting carrier phase ambiguity term is then as shown in Equation 11.

$$\frac{\lambda_1 \lambda_2}{m_2 \lambda_1 + m_1 \lambda_2}(m_1 n_1 + m_2 n_2) \triangleq \lambda_{12}(m_1 n_1 + m_2 n_2) \tag{11}$$

The wavelength of the integer ambiguity term in Equation 11 can be written as $$\lambda_{12} = \frac{c}{m_1 f_1 + m_2 f_2}$$

where c is the speed of light.

The well-known wide-lane carrier phase combination corresponds to $m_1=1$ and $m_2=-1$; the narrow-lane carrier phase combination is obtained with $m_1=1$ and $m_2=1$. Inserting these values into Equation 10 and then using Equation 8 to solve for the corresponding values of $\alpha_1$, which are denoted here as $\alpha_{WL}$ and $\alpha_{NL}$, yields:

$$\alpha_{WL} = \frac{f_1}{f_1 + f_2}, \lambda_{WL} = \frac{c}{f_1 - f_2} \doteq 86 \text{ cm} \tag{12}$$

$$\alpha_{NL} = \frac{f_1}{f_1 - f_2}, \lambda_{NL} = \frac{c}{f_1 + f_2} \doteq 10.7 \text{ cm} \tag{13}$$

Of special note are the generalized code and carrier phase inputs for the wide-lane carrier phase as shown below:

$$P_{NL} = \frac{f_1}{f_1 + f_2}\rho_1 + \frac{f_2}{f_1 + f_2}\rho_2 \triangleq \alpha_{WL}\rho_1 + (1 - \alpha_{WL})\rho_2 \tag{14}$$

$$\Phi_{WL} = \frac{f_1}{f_1 - f_2}\phi_1 - \frac{f_2}{f_1 - f_2}\phi_2 \triangleq \beta_{WL}\phi_1 + (1 - \beta_{WL})\phi_2$$

The code combination that is required to achieve DFS with the wide-lane carrier phase actually corresponds to what is often termed the narrow-lane pseudorange code combination, and we have denoted this accordingly using the subscript notation "NL". The ionospheric free (IF) carrier phase combination has an integer phase ambiguity corresponding to $m_1=77$ and $m_2=-60$ with $\lambda_{IF}=0.63$ cm.

GDFS Error Assessment

An examination is now provided of some of the error characteristics of the GDFS pseudorange as a function of the parameter $\alpha_1$, with special consideration given to the specific cases discussed above.

Smoothed Pseudorange Error Model

Referring to FIG. 4, and Equation 6, the smoothed pseudorange $\bar{P}$ can be written as shown in Equation 15:

$$\bar{P} = FP + (1-F)\Phi$$

$$= r + (\alpha_1 I_1 + \alpha_2 I_2) + F(\alpha_1 w_1 + \alpha_2 w_2)$$

$$+ (1-F)(\beta_1 v_1 + \beta_2 v_2) + (1-F)(\beta_1 N_1 + \beta_2 N_2) \tag{15}$$

Note that in steady state the carrier phase ambiguity term is zero, since the operator 1−F is a high-pass filter. Therefore this term is ignored for the time being.

The ionospheric error will be written in terms of the iono delay at L1 as shown in Equation 16:

$$\delta I = \alpha_1 I_1 + \alpha_2 I_2 = \left[\alpha_1 + (1 - \alpha_1)\frac{f_1^2}{f_2^2}\right] I_1 \tag{16}$$

The pseudorange noise and multipath error is dependent on the smoothing filter bandwidth, however in relative terms the root mean square error due to this component can be written as $$\sigma_P = \sqrt{\alpha_1^2 \sigma_{\rho 1}^2 + (1-\alpha)^2 \sigma_{\rho 2}^2} \quad (17)$$

where $\sigma_{\rho x}$ is the RMS Lx pseudorange noise and multipath error and we have assumed that the L1 and L2 errors are independent. For a long smoothing time constant, the residual carrier phase noise can be approximated by ignoring the CMC filter as shown in Equation 18:

$$\sigma_\Phi = \sqrt{\beta_1^2 \sigma_{\phi 1}^2 + (1-\beta_1)^2 \sigma_{\phi 2}^2} \quad (18)$$

Error Evaluation

Figure 5:
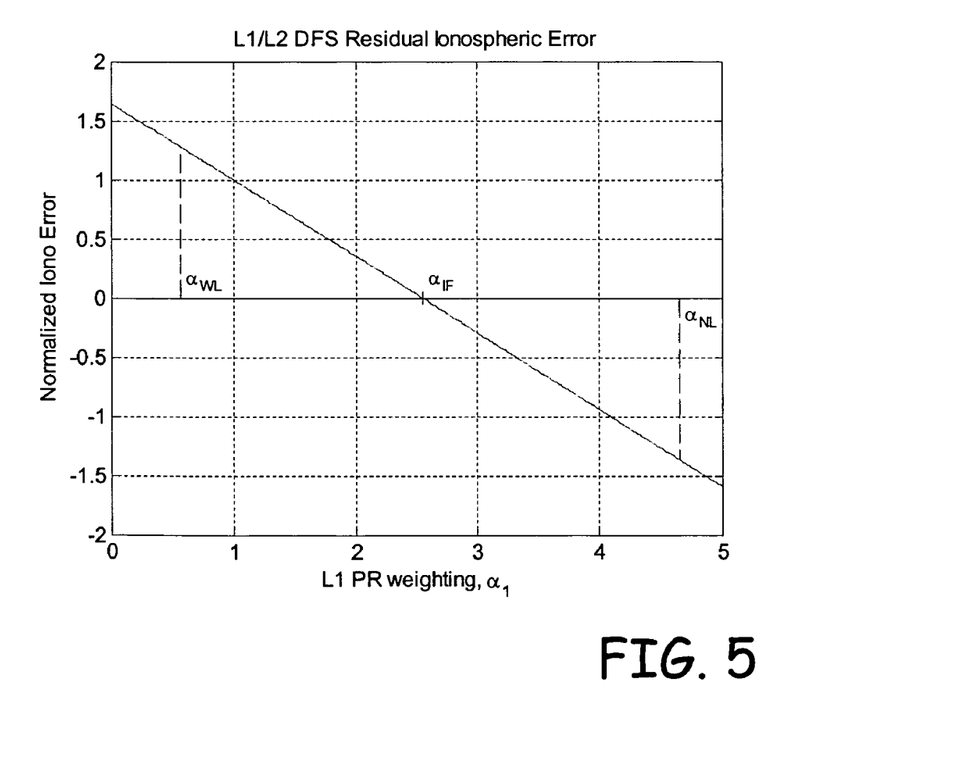
FIGS. 5-7 are plots illustrating normalized residual ionospheric error, normalized pseudorange error, and normalized carrier phase error, respectively.
Figure 6:
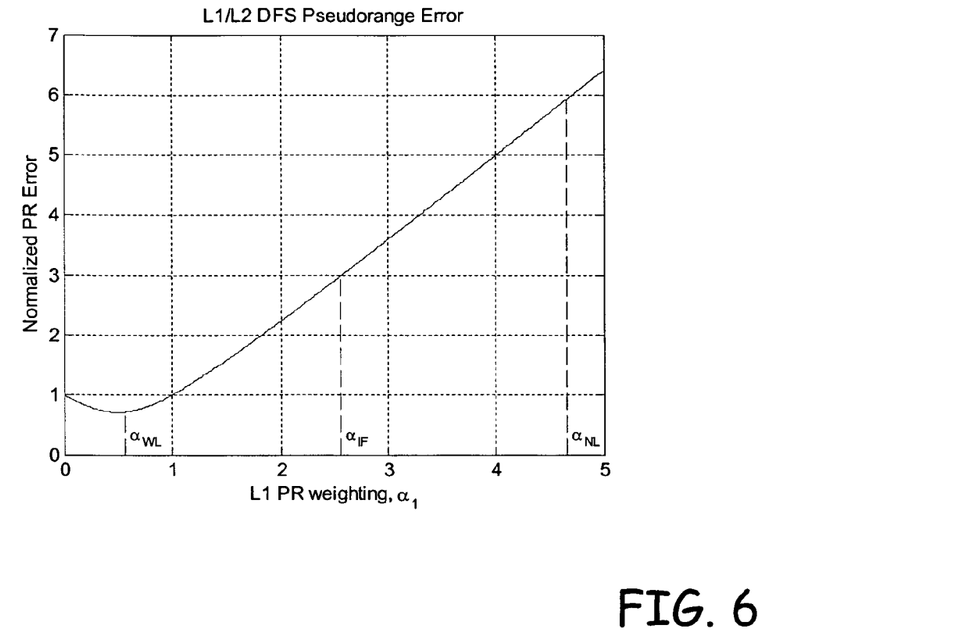
Figure 7:
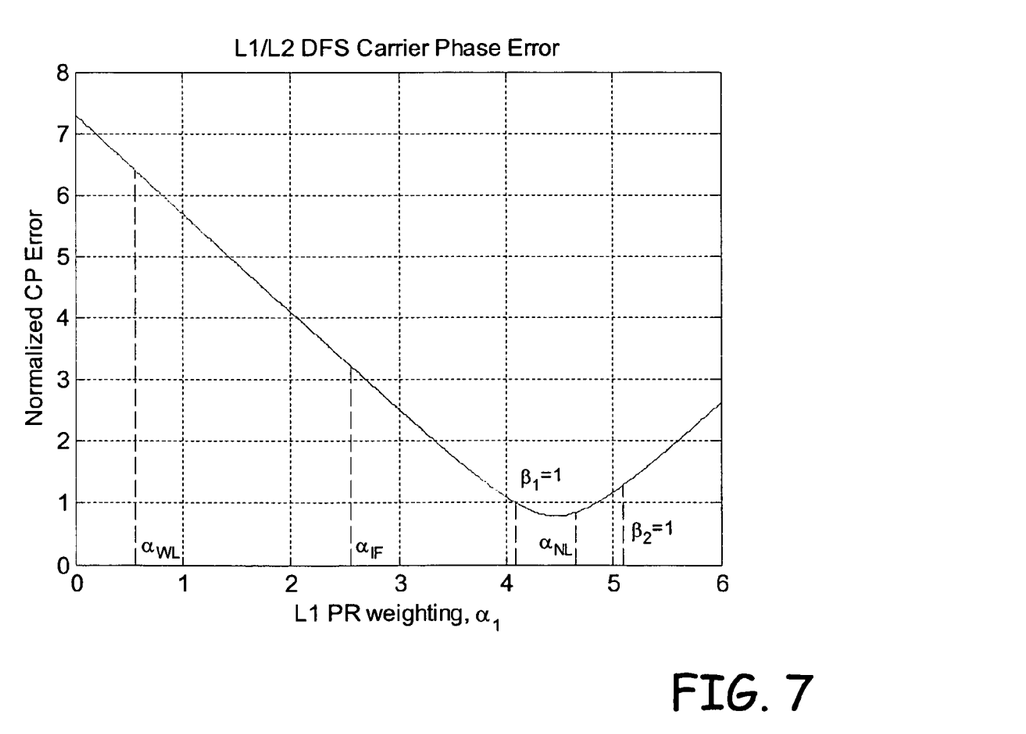

Evaluation of Equations 16, 17 and 18 are plotted in FIGS. 5-7. FIG. 5 illustrates a plot of normalized residual ionospheric error for GDFS with L1 AND L2. FIG. 6 is a plot illustrating normalized pseudorange error for GDFS with L1 and L2. FIG. 7 is a plot illustrating normalized carrier phase error for GDFS with L1 and L2.

Referring to FIG. 5, the ionospheric error is expressed in terms relative to the L1 value, i.e., at $\alpha_1 = 1$ the ionospheric error is normalized to be one. The residual ionospheric error plotted in FIG. 3 shows that the error vanishes for the iono-free combination (where $\alpha_1 = \alpha_{IF}$), and increases linearly in magnitude as a function of $\alpha_1 - \alpha_{IF}$. The residual ionosphere is worse for L2 than L1, so for all other things being equal, the L1 DFS is preferred over L2.

Referring now to FIG. 6, to evaluate the GDFS pseudorange error it is assumed that the L2 pseudorange error is equal to the L1 error and the results are normalized with respect to $\sigma_{\rho 1}$. The pseudorange error, plotted in FIG. 6, has a hyperbolic form, with the minimum value of $\sqrt{1/2}$ occurring at $\alpha_1 = 1/2$ because $\sigma_{\rho 1} = \sigma_{\rho 2}$ was chosen. An interesting observation is that the narrow-lane pseudorange, yields an error very close to the minimum value, since $\sigma_{WL} = 0.56$. Thus using the wide-lane carrier phase with the narrow-lane code in the GDFS filter provides about a 29% reduction in pseudorange errors compared to using L1 or L2 DFS.

While the main rationale for using the wide-lane carrier phase in RTK applications is that the longer effective wavelength makes integer ambiguity resolution easier, an additional benefit is the error reduction afforded by the complementary use of the narrow-lane code yields near-optimal float ambiguity performance (in terms of code errors).

The iono-free combination has approximately a factor of three increase in code errors as compared to L1, so there is a trade-off between the use of wide-lane vs. iono-free depending on whether noise and multipath or ionosphere is the dominant error source.

As discussed above, the carrier phase error is plotted in FIG. 7. For this the assumption was made that the phase errors will be proportional to wavelength, so that $\sigma_{\phi 2} = (\lambda_2/\lambda_1) \sigma_{\phi 1}$ and again the error is normalized with respect to L1. The function has a hyperbolic form with the minimum occurring near the narrow-lane carrier phase value. However the code errors at this point are greatly magnified, illustrating the difficulty in fixing the narrow-lane with geometry-free methods.

GDFS DGPS Architecture

Figure 8:
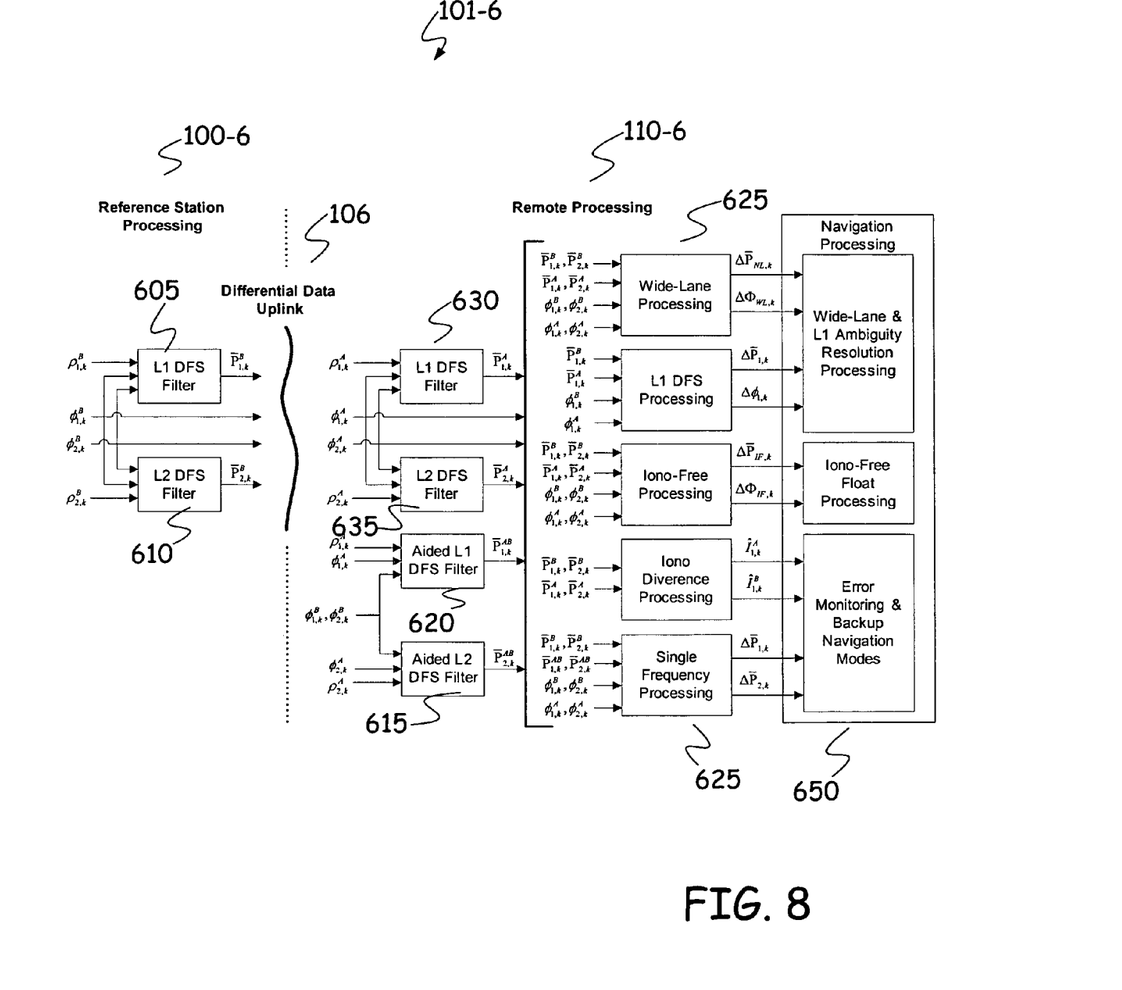
FIG. 8 is a block diagram illustrating a DGPS base station and remote receiver in accordance with some disclosed embodiments.

Referring now to FIG. 8, shown is a GDFS DGPS system 101-6 having a reference or base station 100-6 and a remote receiver 110-6 coupled with a differential data uplink 106. System 101-6 is similar to systems 101 and 101-3 described above with reference to FIGS. 1 and 3. As such, reference or base station 100-6 includes circuitry (L1 DFS filter 605 and L2 DFS filter 610) configured to implement generic processing steps (not specific to any particular smoothing mode of operation) to generate non-mode specific smoothed pseudorange correction data $\overline{P}_{1,k}^B$ and $\overline{P}_{2,k}^B$. The non-mode specific pseudorange correction data $\overline{P}_{1,k}^B$ and $\overline{P}_{2,k}^B$ and carrier phase data $\phi_{1,k}^B$ and $\phi_{2,k}^B$ are transmitted to the remote receiver 110-6 for use in Aided L1 DFS Filters 615 and 620 and/or for use in one of multiple mode specific processing modules 625, as will be described below in greater detail. Remote receiver 110-6 also includes its own L1 and L2 DFS filters 630 and 635 which generate smoothed pseudorange data $\overline{P}_{1,k}^A$ and $\overline{P}_{2,k}^A$ and carrier phase data $\phi_{1,k}^A$ and $\phi_{2,k}^A$ using satellite signals received at the remote receiver. The Aided L1 DFS Filters 615 and 620 use the mix of data to generate pseudorange correction data $\overline{P}_{1,k}^{AB}$ and $\overline{P}_{2,k}^{AB}$. The various mode specific processing modules 625, which are not all required in alternate embodiments of the invention, then use the data from the reference station in combination with the corresponding data described above and generated at the remote receiver, to perform their respective processing functions when a particular mode of smoothing is desired. To switch from one specific smoothing mode to the next (e.g., from wide-lane processing to L1 DFS processing), no changes need be made at base or reference station 100-6. These various modes of operation are described below in greater detail. Note that there are other ways to implement the smoothing filters, including as part of a navigation solution filter; the specific implementation described here is disclosed as an example.

As noted, a DGPS architecture based on L1 and L2 DFS is introduced, and the GDFS concept suggests that improved performance can be obtained. It is well-known that the WL carrier phase/NL code combination can be used in a double difference differential architecture to achieve WL carrier ambiguity determination. However the GDFS concept supports a differential architecture that is even more general, supporting not only the WL carrier phase/NL code architecture, but also other modes of operation, while minimizing the data that needs to be uplinked from the reference station to the airborne unit. This architecture is illustrated in FIG. 8.

The reference station 100-6 produces L1 and L2 DFS pseudoranges. The smoothed generalized pseudoranges $\overline{P}_{1,k}^B$ and $\overline{P}_{2,k}^B$ and the L1 and L2 carrier phase data $\phi_{1,k}^B$ and $\phi_{2,k}^B$ are uplinked to the remote receiver 110-6. In general, the airborne unit performs several types of processing, starting with L1 and L2 DFS processing. The other steps are discussed below.

L1 DFS Processing

The airborne and reference station L1 DFS observables can be used to compute differentially corrected (single-differenced) measurements for navigation processing:

$$\Delta \overline{P}_{1,k} = \overline{P}_{1,k}^A - \overline{P}_{1,k}^B$$

$$\Delta \phi_{1,k} = \phi_{1,k}^A - \phi_{1,k}^B \quad (20)$$

As discussed above, the L1 DFS measurements generally incur less ionospheric error than L2, so are preferred assuming equivalent signal conditions.

Wide-Lane Processing

Since the various GDFS forms are linear combinations of the L1 and L2 observables, other specific combinations can be generated from the L1 and L2 DFS filters. The differentially-corrected narrow-lane code and wide-lane carrier phase are produced (see Equation 14) using the relationships shown in Equations 21:

$$\Delta \overline{P}_{NL,k} = \alpha_{WL}(\overline{P}_{1,k}^A - \overline{P}_{1,k}^B) + (1-\alpha_{WL})(\overline{P}_{2,k}^A - \overline{P}_{2,k}^B)$$

$$\Delta \Phi_{WL,k} = \beta_{WL}(\phi_{1,k}^A - \phi_{1,k}^B) + (1-\beta_{WL})(\phi_{2,k}^A - \phi_{2,k}^B) \quad (21)$$

These single-differenced measurements could be used directly in a carrier-smoothed code navigation solution or combined with other satellite measurements to form double-difference observables for ambiguity resolution as discussed above. Note that the narrow-lane code measurement will yield improved performance compared to the L1 DFS, so this can be a preferred mode of operation except for longer baselines when ionospheric decorrelation errors dominate.

Iono-Free Processing

In the case of long baselines or in elevated ionospheric activity, the additional noise and multipath errors incurred by ionospheric-free processing may be smaller than the residual ionosphere in the WL or L1 solutions. The ionospheric-free observables are obtained as:

$$\Delta \overline{P}_{IF,k} = \alpha_{IF}(\overline{P}_{1,k}^A - \overline{P}_{1,k}^B) + (1-\alpha_{IF})(\overline{P}_{2,k}^A - \overline{P}_{2,k}^B)$$

$$\Delta \Phi_{IF,k} = \alpha_{IF}(\phi_{1,k}^A - \phi_{1,k}^B) + (1-\alpha_{IF})(\phi_{2,k}^A - \phi_{2,k}^B) \quad (22)$$

These measurements may optionally be passed to a parallel navigation solution which would be available in case excessive ionospheric errors are detected.

Iono Divergence Monitoring

As mentioned above, the iono-free smoothed solution can be used when the ionospheric decorrelation between the reference station and the airborne unit is excessive. The instantaneous L1 ionospheric delay can be estimated from the L1 and L2 DFS pseudoranges using Equation 16 as:

$$\hat{I}_{1,k} = \frac{f_2^2}{f_1^2 - f_2^2}(\overline{P}_{2,k} - \overline{P}_{1,k}) \quad (24)$$

The rate of change of the ionospheric delay estimates can be computed delta-range carrier phase measurements as well.

Back-Up Single Frequency Processing

A variation of the L1 or L2 DFS processing has been proposed to support single frequency airborne units (either due to only having single frequency equipment or if one frequency is lost at the airborne unit). The basic idea is to use dual frequency carrier phase data uplinked from the reference station to make up for the lack of dual frequency carrier phase data at the airborne unit, as illustrated as the "Aided DFS" blocks in FIG. 6. Taking the L1 DFS case for example, the generalized carrier phase at the airborne is computed as $$\Phi_1^{AB} = \phi_1^A + \frac{2f_2^2}{f_1^2 - f_2^2}(\phi_1^B - \phi_2^B) \quad (25)$$

$$P_1^A = \rho_1^A$$

An alternative single frequency backup would be to do conventional single frequency carrier smoothed code as is done for civil Ground Based Augmentation Systems, which require that the ground and airborne units must use the same time constant in the filter.

CONCLUSIONS

The Generalized Divergence-Free Smoothing concept proposed here offers a number of performance and operational advantages over conventional DFS DGPS architectures. The use of the wide-lane carrier phase combination with the narrow-lane code combination yields a smoothed pseudorange with reduced errors-approximately 30% less than for the L1 or L2 cases. The key point is that this reduction occurs prior to smoothing, so that bias errors are attenuated as well. This improvement in pseudorange accuracy has been shown to be close to the optimal achievable by a DF code/carrier combination that retains an integer carrier phase ambiguity.

The GDFS DGPS architecture described here offers maximum flexibility and robustness to airborne participants. The GDFS processing yields the best carrier smoothed code processing that can be achieved, which can be used directly for land based applications or as the initialization for carrier phase RTK. The modeling methodology developed here can be readily applied to modernized GNSS signals and different signal combinations than those used from the current GPS ones may be found to yield optimal performance.

Figure 9:
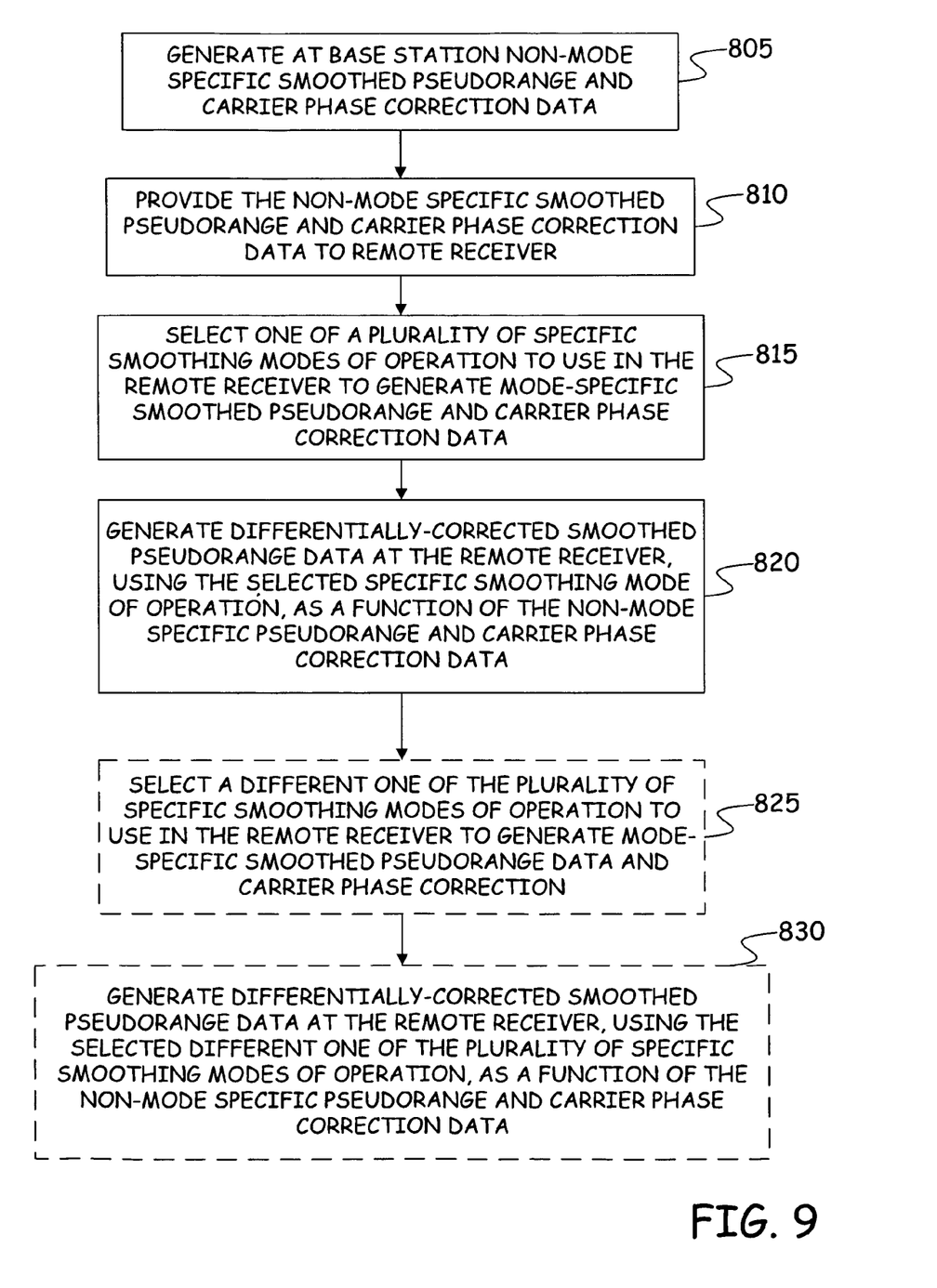
FIG. 9 is a flow diagram illustrating method embodiments.

The above-described methods of generating differentially-corrected smoothed pseudorange data in a DGPS can be represented, for example, in the flow diagram shown in FIG. 9. As shown in FIG. 9, these methods include the step 805 of generating, at the base station, non-mode specific smoothed pseudorange and carrier phase correction data. Then, as illustrated at step 810, these methods include providing the non-mode specific smoothed pseudorange and carrier phase correction data to a remote receiver. At step 815, these methods include the step of selecting one of a plurality of specific smoothing modes of operation to use in the remote receiver to generate mode-specific smoothed pseudorange data. Examples of the various specific smoothing modes of operation are as described above. Then, as illustrated at step 820, the method includes generating the differentially-corrected smoothed pseudorange data at the remote receiver using the selected one of the plurality of specific smoothing modes of operation. The differentially-corrected smoothed pseudorange data is generated as a function of the non-mode specific pseudorange and carrier phase correction data received from the base station.

To illustrate the flexibility afforded in some embodiments of the invention, FIG. 9 also illustrates optional additional steps 825 and 830. In step 825, a different one of the plurality of specific smoothing modes of operation is selected for use in the remote receiver to generate mode-specific smoothed pseudorange data. Then, in step 830, the differentially-corrected smoothed pseudorange data is generated at the remote receiver using the selected different one of the plurality of specific smoothing modes of operation, but still as a function of the non-mode specific pseudorange and carrier phase correction data received from the base station. Therefore, no changes are required of the base station processing.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of generating differentially-corrected smoothed pseudorange data in a differential global positioning system (DGPS), the method comprising:

generating at a base station non-mode specific pseudorange and carrier phase correction data;

providing the non-mode specific pseudorange and carrier phase correction data to a remote receiver;

selecting one of a plurality of specific smoothing modes of operation to use in the remote receiver to generate mode-specific smoothed pseudorange data; and generating the differentially-corrected smoothed pseudorange data at the remote receiver, using the selected one of the plurality of specific smoothing modes of operation, as a function of the non-mode specific pseudorange and carrier phase correction data received from the base station.

2. The method of claim 1, wherein selecting the one of the plurality of specific smoothing modes of operation further comprises selecting the one of the plurality of specific smoothing modes of operation to optimize pseudorange errors.

3. The method of claim 1, and further comprising:
selecting a different one of the plurality of specific smoothing modes of operation to use in the remote receiver to generate mode-specific smoothed pseudorange data; and generating the differentially-corrected smoothed pseudorange data at the remote receiver, using the selected different one of the plurality of specific smoothing modes of operation, as a function of the non-mode specific pseudorange and carrier phase correction data received from the base station.

4. The method of claim 1, wherein the plurality of specific smoothing modes of operation includes at least one divergence free smoothing (DFS) processing mode of operation.

5. The method of claim 1, wherein the plurality of specific smoothing modes of operation includes at least one wide-lane (WL) processing mode of operation.

6. The method of claim 1, wherein the plurality of specific smoothing modes of operation includes at least one iono-free processing mode of operation.

7. The method of claim 1, wherein the plurality of specific smoothing modes of operation includes at least one iono-divergence monitoring mode of operation.

8. The method of claim 1, wherein the plurality of specific smoothing modes of operation includes at least one back-up single frequency processing mode of operation.

9. A differential global positioning system (DGPS) comprising:
a base station configured to generate non-mode specific pseudorange and carrier phase correction data; and a remote receiver configured to implement one or more of a plurality of specific smoothing modes of operation, using the non-mode specific pseudorange and carrier phase correction data, to generate smoothed pseudorange data.

10. The DGPS of claim 9, and further comprising a data link between the base station and the remote receiver, the non-mode specific pseudorange and carrier phase correction data being transmitted to the remote receiver over the data link.

11. The DGPS of claim 9, wherein the remote receiver is configured to generate the smoothed pseudorange data using a selected one of the plurality of specific smoothing modes of operation.

12. The DGPS of claim 11, wherein the remote receiver is configured to select the one of the plurality of specific smoothing modes of operation which will optimize pseudo-range errors.

13. The DGPS of claim 11, wherein the plurality of specific smoothing modes of operation includes at least one divergence free smoothing (DFS) processing mode of operation.

14. The DGPS of claim 11, wherein the plurality of specific smoothing modes of operation includes at least one wide-lane (WL) processing mode of operation.

15. The DGPS of claim 11, wherein the plurality of specific smoothing modes of operation includes at least one iono-free processing mode of operation.

16. The DGPS of claim 11, wherein the plurality of specific smoothing modes of operation includes at least one iono-divergence monitoring mode of operation.

17. The DGPS of claim 11, wherein the plurality of specific smoothing modes of operation includes at least one back-up single frequency processing mode of operation.

* * * * *